United States Patent [19]

Thomas

[11] Patent Number: 4,504,219
[45] Date of Patent: Mar. 12, 1985

[54] HEATING APPARATUS FOR CIRCULATORY-FIRING OPEN BAKING FURNACES AND PROCESS FOR USE OF THE APPARATUS

[75] Inventor: Jean-Claude Thomas, L'Argentiere, France

[73] Assignee: Aluminium Pechiney, Lyons, France

[21] Appl. No.: 515,042

[22] PCT Filed: Oct. 27, 1982

[86] PCT No.: PCT/FR82/00175
§ 371 Date: Jun. 27, 1983
§ 102(e) Date: Jun. 27, 1983

[87] PCT Pub. No.: WO83/01677
PCT Pub. Date: May 11, 1983

[30] Foreign Application Priority Data

Oct. 29, 1981 [FR] France ................. 81 20613

[51] Int. Cl.³ .................. F27D 7/00; F27B 7/00
[52] U.S. Cl. ......................... 432/4; 432/19; 432/192
[58] Field of Search ............... 432/4, 19, 192

[56] References Cited

U.S. PATENT DOCUMENTS 2,699,931  1/1955  Buhler et al. ............... 432/6
3,975,149  8/1976  Racunas et al. ............ 432/209
4,040,778  8/1977  Black .......................... 432/192
4,382,778  5/1983  Peacey et al. ............... 432/192

FOREIGN PATENT DOCUMENTS 693298   8/1940  Fed. Rep. of Germany .
1404628  5/1965  France .
50-13288 5/1975  Japan ........................... 432/192

Primary Examiner—John J. Camby
Attorney, Agent, or Firm—Oblon, Fisher, Spivak, McClelland & Maier

[57] ABSTRACT

The heating apparatus according to the invention concerns open circulatory-firing baking furnaces comprising an assembly of chambers which are heated by gases which circulate in hollow partitions (7, 19, 25) which divide the chambers into compartments. The hot gases are produced by fuel injection means (13, 17) which are placed in the upper part of the partitions.

In accordance with the invention, instead of the fuel injectors (13, 17) being placed in the same direction as the flow of combustion-supporting gas, the injectors (26, 29) are placed countercurrent, which permits the temperature distribution and the accuracy of the control action to be substantially enhanced.

The apparatus is applied in particular to baking carbon anodes which are used in aluminum electrolysis cells.

7 Claims, 4 Drawing Figures

HEATING APPARATUS FOR CIRCULATORY-FIRING OPEN BAKING FURNACES AND PROCESS FOR USE OF THE APPARATUS

BACKGROUND OF THE INVENTION

The countercurrent heating apparatus which is the object of this invention concerns baking furnaces which are referred to as circulatory-firing open furnaces, in which an assembly of chambers, often placed in two parallel lines, are heated by gases raised to high temperature, which circulate in hollow partitions. The partitions which divide the chambers into compartments are themselves placed in a number of lines which are parallel to each other and also to the lines of chambers.

The partitions in the same line are connected together, at their ends, to permit the gases to flow sequentially therethrough. The products to be heated are filled into the compartments and heat is transmitted thereto by conduction through the walls of the partitions. These furnaces are used in particular for baking carbon products such as, for example, the carbon anodes of aluminum electrolysis cells. In each compartment, the carbon products are protected from oxidation by a thick layer of small-grain carbon material which covers them and fills all the free spaces. The compartments remain open in their upper part.

One of the serious difficulties which is encountered in operating such furnaces is that of reproducibly performing a cycle involving heating and cooling the products, to enable them to be baked under optimum conditions. The temperature cycle which should be imposed on the products to bake them is generally well known, but the difficulty arises in ensuring that the products which are placed in different zones of each compartment are actually subjected to a temperature cycle that is close to the optimum cycle.

When baking carbon anodes, it is important in particular that they be raised to a maximum temperature of at least around 1100° C. to achieve the desired physical-chemical characteristics. Any overheating of the anodes in the hottest zones may cause the physical characteristics of the anodes to be modified, in comparison with the characteristics of anodes which are baked at lower temperatures. The result of this is heterogeneity of the characteristics of the batches of baked anodes produced, which, as is known, has highly disadvantageous consequences on the conditions of operation of the aluminum electrolysis cells in which the anodes are subsequently used. In addition, uncontrolled overheating causes accelerated deterioration in the refractory linings, and that results in rapid deformation of the heating partitions, so that the service life is thus very substantially reduced.

In general, the partitions are heated in the zone referred to as the baking zone, by fuel injection means placed in the upper part of the partitions.

A jet of fuel such as a heavy fuel oil or a fuel gas is thus introduced into a current of preheated combustion-supporting gas, the jet of fuel or gas being oriented in the direction of flow of the combustion-supporting gas.

In many cases, the partitions include baffles for causing the gases to flow in a zigzag configuration, in a downward direction and then in an upward direction, and so on.

Experience has shown that this method of heating the partitions causes overheating in the lower part thereof.

As already stated, such overheating results, on the one hand, in heterogeneity in the physical characteristics of the anodes which are baked in the chambers and, on the other hand, accelerated deformation of the partitions in the most heavily loaded zone, which results in a very substantial reduction in the service life thereof.

A way has been sought to avoid such overheating of the partitions in the lower zone thereof and also to obtain improved distribution of deformation stresses in the partitions, to prolong their service life by a substantial amount.

SUMMARY OF THE INVENTION

The heating apparatus for an open circulatory-firing baking furnace, which is the object of this invention, makes it possible to avoid or reduce overheating of the partitions in the lower zone. It comprises means for injecting a liquid, gaseous or even solid fuel into a flow of combustion-supporting gas, the fuel jet or jets being oriented countercurrent, i.e., in the opposite direction to the direction of movement of the flow of combustion-supporting gas.

BRIEF DESCRIPTION OF THE DRAWINGS

The description and drawings hereinafter will enhance comprehension of the features of the apparatus for heating open circulatory-firing baking furnaces which are generally used, and the features of the novel heating apparatus which is the object of this invention. As will be seen, the invention also concerns a process which permits deformation of the bricks forming the partitions to be better distributed, thereby enhancing the service life of the partitions.

DETAILED DESCRIPTION OF THE PREFERRED EMBODIMENTS

Figure 1:
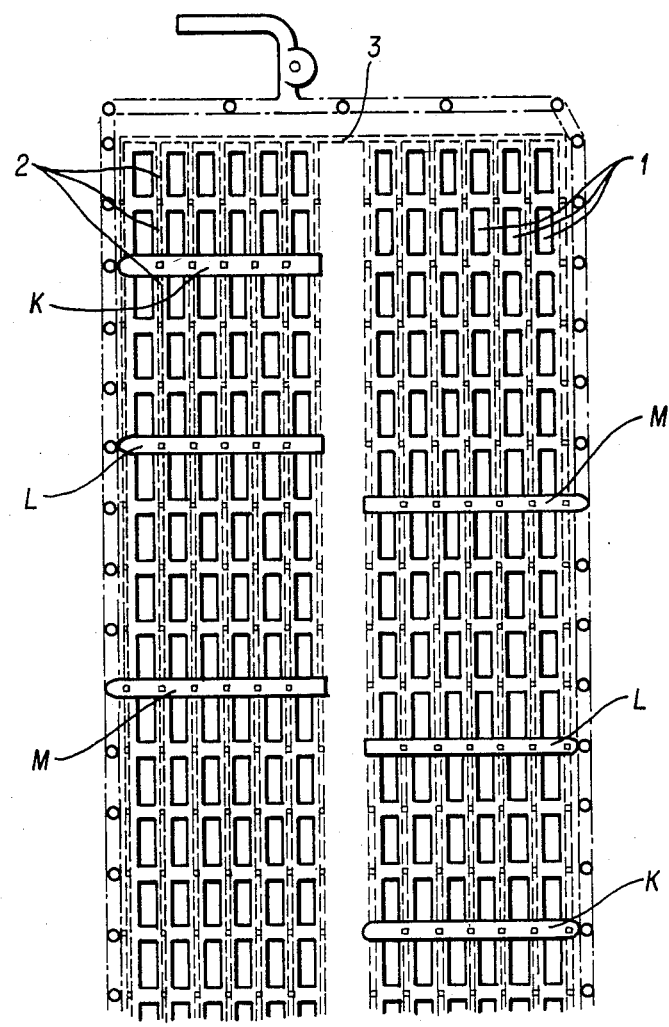
FIG. 1 is a plan view of a part of an open circulatory-firing baking furnace of known type.

U.S. Pat. No. 2,699,931 describes, as shown in FIG. 1 (which partially reproduces FIG. 1 of the patent cited), a circulatory-firing baking furnace comprising 60 chambers or sections which are placed in two parallel rows of 30 chambers, of which 28 are shown in the drawing. Each chamber comprises 6 compartments arranged side-by-side such as at 1, in which the products to be baked are placed, covered with a filling material. Between the compartments, hollow partitions such as 2 are disposed in line in such a way that the gases can pass sequentially through the partitions forming part of the same line. At the end, a loop conduit 3 permits the gas circuits to be interconnected from one row to another.

In operation, the cycle comprising heating and then cooling the products is performed by means of a system which is referred to as a circulatory firing system and which is applied to a group of chambers arranged in series, in which a certain number of chambers are in a preheating phase, some chambers are in a baking phase and finally some chambers are in a cooling phase.

The location of such a group in the arrangement of chambers which forms the furnace is determined by the respective points of connection of the cold air intake duct K, the row of heating burners L and finally the burnt gas extraction duct M. After a hold time on the order of 16 to 48 hours, the points of connection of the air intake duct K and burnt gas discharge duct M and the row of burners L are moved one chamber. This movement is in the direction of flow of the air and the burnt gases. As shown in FIG. 1, a plurality of circulatory firing means may pass through the chambers of the same furnace at the same rate.

Figure 2:
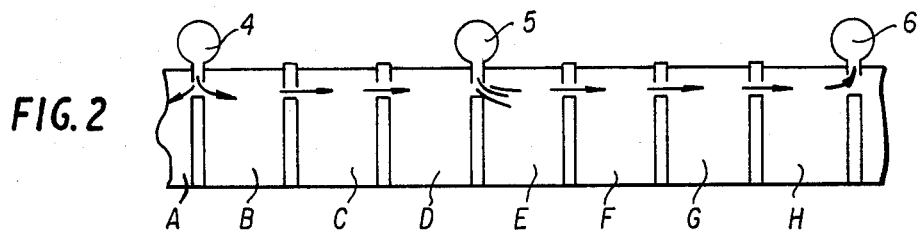
FIG. 2 is an elevation sectional view of the partitions and the furnace shown in FIG. 1.

FIG. 2 shows in cross section what takes place within a line of partitions forming part of the same group of chambers. It will be seen that a part at least of the cold air which is introduced by the duct 4 at the site of separation between the partitions A and B passes through the partition B and then the following two partitions C and D which correspond to chambers in a cooling mode, whereby it is gradually heated. At the moment at which this flow of air which has thus been preheated to a temperature of 500° C. passes from partition D to partition E, an injector 5 sends a jet of fuel into the flow of air, in the same direction as the direction of flow of the air. This jet of fuel passes into the partition E, burning upon contact with the very hot air which is passing through this partition. Further on, the combustion gases pass through the partitions of chambers F, G and H, causing them to be preheated, and finally issue by way of the duct 6 which discharges the gas to a stack.

It will be appreciated that, with an arrangement of burners as illustrated in FIG. 2, it is very difficult to achieve a certain degree of homogeneity of temperature in the partition in which the combustion process takes place, bearing in mind the relative narrowness of the space reserved for the gases to flow within the partition. It is stated, moreover, in the above-quoted patent that, to achieve better temperature distribution, it is possible to envisage baffle arrangements within the partitions, to enable the gases to be circulated along a tortuous path.

Figure 3:
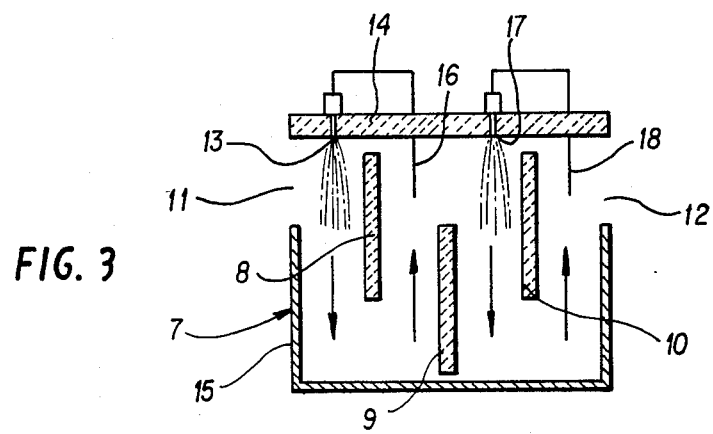
FIG. 3 is an elevation sectional view of the usual arrangement of the injectors on a partition of a circulatory-firing furnace of known type.

FIG. 3 shows a hollow partition 7 which is comparable in its basic principle to the partitions shown in FIGS. 1 and 2 and which has been so arranged as to promote heat exchange between its walls and the gases which flow through the interior thereof. The aim is to cause the gases to sweep over the walls of the partition, over the entire height and length thereof. For this purpose, there are placed in the hollow intermediate space in the partition 7 vertical baffle members 8, 9 and 10 which are gripped between the two large walls of the partition. These baffles therefore force the flow of gas coming from the previous partition, which enters by way of connecting orifice 11, to flow through the partition in a zigzag path, as indicated by the arrows, finally to issue by way of the orifice 12 which connects with the following partition.

The injector 13 which passes through the cover 14 of the partition sprays a jet of fuel oil directed downward which ignites upon contact with the hot air which, after having entered the partition by way of the orifice 11, is directed downwardly by the baffle 8 and the wall 15 of the cell. Depending on the characteristics of the fuel oil used, combustion continues over a greater or shorter path of flow of the gases, and then the hot gases continue their zigzag flow to the outlet orifice 12. A temperature-regulating thermoelectric couple 16 is generally placed out of the direct line of sight of the flame, behind the baffle 8, in the vicinity of the top of the cell.

In many cases, to improve the distribution of the heating action, a second injector 17 is placed in the zone where the gas flow moves down again towards the bottom of the partition, between the baffles 9 and 10. This injector is in turn regulated by a thermoelectric couple 18 which is separated from the burner by the partition 10. In some cases, the thermoelectric couple 16 is omitted and the thermoelectric couple 18 controls the two injectors 13 and 17. Tests have shown that such an arrangement of the baffles and the injectors and their control couples gives relatively favorable results as regards the efficiency of the heat exchanges between the hot gases and the products contained in the compartments, by conduction through the walls of the cells.

In contrast, serious difficulties have been encountered in achieving homogeneous temperature distribution in a vertical direction, more particularly when using a fuel oil for heating. Usually, the highest temperatures are found at the bottom of the partitions, and the lowest temperatures at the top. It is clear that, under these conditions, the products which are placed at the bottom of the partition will be subjected to a higher degree of baking than those at the top. On the other hand, as regards the walls of the partitions, it has been found that there are very serious deformations due to creep of the refractory brick structures forming the partition walls, in the vicinity of the bottom, i.e., in the zone where the refractory bricks carry the load of the entire stack.

If these deformations are to be avoided by lowering the control temperature, it is found that in many cases the temperature reached in the upper zones of the compartments is no longer sufficient to cause the products to be correctly baked. Temperature measurements taken within the partitions, by means of couples for registering the temperatures reached simultaneously in a plurality of locations distributed in the partitions have revealed temperature differences which can reach 150° C. or more, between the top and the bottom of these partitions, with the maximum temperatures always being reached at the bottom of the partitions, in the zones in the extension of the axis of the injectors. An attempt has been made to find a possible way of very substantially reducing the temperature differences which occur between the upper and lower zones of the partitions, without making substantial modifications in the actual structure of the hollow partitions, a structure that is the result of progressive optimisation on the basis of long experience.

The apparatus of the process according to the invention make it possible to reduce temperature differences and deformations of the partitions in a particularly simple and effective way.

The heating apparatus for an open circulatory-firing baking furnace according to the invention comprises hollow partitions, within which a flow of combustion-supporting gas circulates, and injection means for introducing a fuel into this flow at least one injection means being oriented to direct a jet of fuel countercurrent to the flow of combustion-supporting gas flow.

The invention also relates to a process for prolonging the operating life of the heating partitions of an open circulatory-firing baking furnace, in which the length of the flame which is formed at the outlet of the fuel injector or injectors placed in the upper part of said partitions is shortened by guiding the flow of combustion-supporting gas within each of said partitions, so that the direction of movement thereof is opposite to the direction of the jet or jets of fuel for at least a part of the time for heating the partitions.

Figure 4:
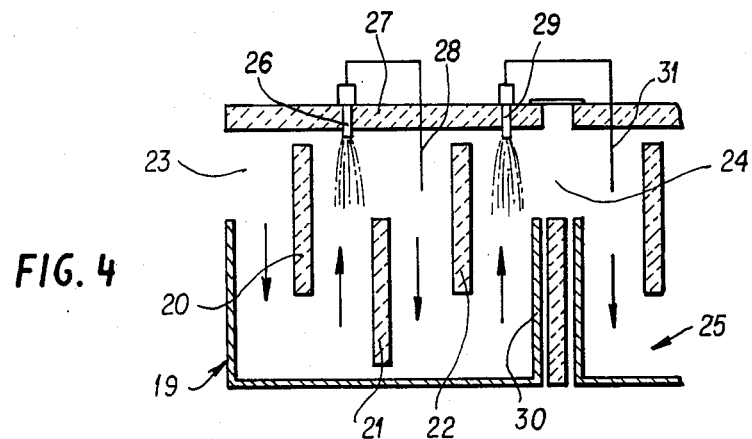
FIG. 4 is an elevation sectional view of the countercurrent arrangement, in accordance with the invention, of the injectors on the partition shown in FIG. 3.

FIG. 4 shows, in a nonlimiting way, an embodiment of the novel apparatus according to the invention. The partition 19 in which baffles 20, 21 and 22 are placed in the same manner as in the case of the partition 7, has flowing therethrough a flow of gas which follows a zigzag path, entering the partition by way of the orifice 23 and then flowing therethrough in the direction indicated by the arrows to the discharge orifice 24 which connects the partition 19 to the partition 25. A fuel injector 26 which passes through the cover 27 of the partition 19 directs a jet of heavy fuel oil downward into the zone between the baffles 20 and 21, being the zone in which the gas flow is in an upward direction. The temperature monitoring and/or controlling thermoelectric couple 28 is placed in the upper part of the zone between the baffles 21 and 22 so that, by virtue of the low position of the baffle 21, it is in sight of a part a least of the flame resulting from combustion of the fuel sprayed from the injector 26.

As shown also in FIG. 4, it is possible for a second injector 29 to be placed in the same partition, in the zone between the baffle 22 and the wall 30 which separates the partition 19 from the following partition 25. As shown in FIG. 4, the second injector is also placed so that the direction of the jet of fuel that it projects, is countercurrent to the gas flow which is in an upward direction. Operation of the second injector 29 is monitored and/or controlled by a second thermoelectric couple 31 which is placed in the upper part of the following partition 25 in contact with the flow of gas which issues from the partition 19 by way of the orifice 24.

Practical operating tests were carried out on the same circulatory-firing baking furnace comprising chambers provided with partitions of the type shown in FIGS. 3 and 4, and comprising either standard devices for injecting fuel into the partitions of the baking chambers, like those shown in FIG. 3, or, in contrast, countercurrent injection devices in accordance with the invention, as shown in FIG. 4. The fuel used was a heavy fuel oil. The partitions were about 4.5 meters in height and 5 meters in length, with an inside width of 0.250 meter.

Comparative tests of baking carbon products showed that, all other things being equal, the temperatures of the walls of the partitions are much better distributed when using the novel countercurrent injection device.

Temperature measurements were taken in the vicinity of the axis of the injectors, in the refractory wall of the partition, at the top, halfway down and at the bottom.

The following table sets out the results obtained:

| | Mean temperature of the partitions in the vicinity of the axis of the injectors, in °C. | |
|---|---|---|
| | Injection in the direction of the flow of gas | Countercurrent injection |
| Temperature measured by the regulating thermocouples | 1170 | 1222 |
| Temperature at the top of the partition | 1175 | 1180 |
| Temperature halfway down the partition | 1285 | 1290 |
| Temperature at the bottom of the partition | 1295 | 1180 |

It is seen that, with the standard apparatus, the bottom of the partitions reach a mean temperature of 1295° C. Actually, in many cases, the temperature there exceeds 1300° C., which is a cause of deformation due to creep which results in a very substantial reduction in service life. At the top of the partition, the mean temperature is 120° lower, while in the middle, the temperature is only slightly lower than the temperature at the bottom. It is also found that the temperature at the bottom is more than 120° C. higher than the temperature which is fixed as a control reference, whereby this control loses all the accuracy that is expected of it.

In contrast, when operating in a countercurrent mode, the temperatures of the partitions, at the top and at the bottom, are virtually equal while halfway down, the temperature is about a hundred degrees higher. Such a temperature distribution is much better. Actually, the lower part of the partition, in which the bricks carry the heaviest load, is then at a temperature which is lower than the mid-height temperature, and therefore resist creep much better. Moreover, the upper zone which is generally too cold is at a temperature that is at least equal to the temperature at the bottom, which is particularly advantageous for uniformity of the baking. Finally, it has been found that the arrangement adopted for the control thermocouples, exposing them to a part of the injection flames, considerably enhances the accuracy and sensitivity of the control equipment.

Tests have shown that using the apparatus according to the invention permits the service life of the partitions in such furnaces to be increased by about 30%. Actually, deformation of the partitions due to creep generally requires them to be replaced, when baking carbon products, at intervals of time of the order of two years. Using the injection apparatus according to the invention makes it possible to envisage an average increase of from 6 to 8 months in the operating life of the partitions, which is a substantial saving.

This advantage of countercurrent injection is particularly important when using heavy fuel oils of the type corresponding to the test described. Actually, when such fuel oils are injected in the direction of the flow of gases, the degree of overheating at the bottoms of the partitions is particularly high. That is due to the slow combustion of such fuel oils, which have a high vaporization temperature. The effect of the countercurrent, which considerably retards the downward falling movement of the fuel oil droplets, is then particularly evident. On the other hand, when using fuel oil, a large part of the heat is emitted by radiation from the flame. When using the standard apparatus, the thermocouple, being separated from the flames by a baffle, does not take account of that radiation which, in contrast, directly affects the surrounding bricks. In contrast, in the countercurrent mode of injection, the thermocouple is exposed to the flame so that it can directly receive the radiant heat therefrom.

The advantage of countercurrent injection in accordance with the invention, although less substantial, is also observed when injecting lighter fuel oils and also, although in a markedly less evident manner, when injecting gaseous fuels such as for example natural gas. When using natural gas, the problem which arises due to slow vaporization of the droplets of hydrocarbons actually does not occur, and the temperature distribution observed in a vertical direction is more regular.

However, depending on the type of gas injector used, the flame may produce an amount of radiant heat which is as high as that produced by a fuel oil flame. In that case, the position of the thermocouple which offers exposure to the flame, as permitted by the countercurrent mode of injection, is a decisive consideration for the precision and sensitivity of the control action.

When using gas injectors which, in one or other of the two positions, give a temperature distribution which is not very different, it is, however, advantageous to extend the operating life of the partitions, to use the two combustion modes at the same time, with the injectors being placed alternately in the direction of the flow or countercurrent.

When the furnace comprises a single firing means the position of the injectors is modified at regular intervals of time. In the case of a furnace having a plurality of firing means, it is possible for one firing means to be operated systematically in one position and the other in the contrary position. The part of the partitions which is the most liable to deformation is actually the part which is directly below the injectors. The specified arrangement then permits the action of the burners to be distributed over the whole of the partition. This results in the rate of deformation of the partitions being slowed down.

Other embodiments of the countercurrent injection apparatus for an open circulatory-firing baking furnace may be envisaged, which do not go outside the scope of the invention. Likewise, many processes may be envisaged for using the apparatus under conditions which permit improved temperature distribution in such furnaces, a lower rate of deformation of the heating partitions, or improved distribution of the deformations of these partitions, resulting in the partitions having a longer operating life. All such processes are also part of this invention.

I claim:

1. A heating apparatus for an open circulatory firing baking furnace having a plurality of baking chambers, said heating apparatus comprising:
   hollow partitions separating said baking chambers;
   means for introducing a combustion supporting gas flow into said hollow partitions in a gas flow direction;
   baffle means in each of said hollow partitions for dividing each of said hollow partitions into at least two opposite combustion supporting gas flow paths;
   fuel injection means positioned in each said hollow partition for producing a flame by combustion, each said fuel injection means being oriented so as to inject a stream of fuel into said gas flow in a direction countercurrent to said gas flow direction; and
   temperature controlling means including temperature sensing means positioned in each said hollow partition at a location in a line of sight of a flame produced by combustion of said injected fuel for controlling said fuel injection means.

2. A heating apparatus as in claim 1, wherein the fuel injection means and temperature sensing means are placed in an upper part of the partition and said fuel injection means directs said stream of fuel downward.

3. A heating apparatus as in claim 1 or claim 2, wherein the fuel is one of the group consisting of a gas a liquid and a solid.

4. The heating apparatus of claim 2 wherein said baffle means comprise three parallel baffles defining four parallel said flow paths.

5. The heating apparatus of claim 1 wherein said baffle means comprise three parallel baffles defining four parallel said flow paths.

6. A process for heating an open circulatory baking furnace having a plurality of baking chambers separated by hollow partitions having baffle means therein, said process comprising the steps of:
   introducing a combustion supporting gas flow into said hollow partitions and through oppositely directed flow paths defined by said baffle means in each said partition;
   injecting a stream of fuel into each said partition in an injection direction and at a position where said injection direction is countercurrent to a direction of a flow of said gas, whereby a length of a flame produced by combustion of said fuel is shortened by said countercurrent gas flow;
   positioning a temperature sensing means in each said partition at a location in direct line of sight with said flame; and
   controlling combustion as a function of said sensed temperature.

7. The process of claim 6 including the step of intermittently alternately injecting said stream of fuel in an injection direction and a position where said injection direction is co-current to said gas flow direction.

* * * * *